United States Patent
Turner et al.

(10) Patent No.: US 7,382,572 B1
(45) Date of Patent: Jun. 3, 2008

(54) DISK DRIVE WITH FLEXIBLE, INTEGRATED BREATHER/RECIRCULATION FILTER ELEMENTS

(75) Inventors: Robert D. Turner, Thornton, CO (US); Paul Stasiewicz, Arvada, CO (US); William L. Drake, Lyons, CO (US)

(73) Assignee: Maxtor Corporation, Scotts Valley, CA (US)

( * ) Notice: Subject to any disclaimer, the term of this patent is extended or adjusted under 35 U.S.C. 154(b) by 471 days.

(21) Appl. No.: 10/916,221

(22) Filed: Aug. 11, 2004

Related U.S. Application Data

(63) Continuation-in-part of application No. 10/731,423, filed on Dec. 9, 2003, now abandoned.

(60) Provisional application No. 60/432,157, filed on Dec. 10, 2002.

(51) Int. Cl.
G11B 33/14 (2006.01)

(52) U.S. Cl. .................................................. 360/97.02

(58) Field of Classification Search ............. 360/97.02, 360/97.03, 97.04
See application file for complete search history.

(56) References Cited

U.S. PATENT DOCUMENTS

| | | | |
|---|---|---|---|
| 6,077,335 A | 6/2000 | Schneider et al. | |
| 6,208,484 B1 * | 3/2001 | Voights | 360/97.02 |
| 6,266,208 B1 | 7/2001 | Voights | |
| 6,296,691 B1 | 10/2001 | Gidumal | |
| 6,395,073 B1 | 5/2002 | Dauber | |
| 6,475,269 B1 | 11/2002 | Turner | |
| 2002/0075590 A1 * | 6/2002 | Garikipati et al. | 360/97.02 |
| 2002/0089781 A1 * | 7/2002 | Tuma | 360/97.02 |
| 2002/0194989 A1 | 12/2002 | Tuma et al. | |
| 2003/0151847 A1 * | 8/2003 | Tsang et al. | 360/97.02 |
| 2003/0156351 A1 * | 8/2003 | Voights et al. | 360/97.02 |

FOREIGN PATENT DOCUMENTS

JP         03054791 A    *    3/1991

* cited by examiner

*Primary Examiner*—Craig A. Renner
(74) *Attorney, Agent, or Firm*—Leanne Taveggia Farrell Westman Champin & Kelly, P.A.

(57) ABSTRACT

A filter assembly in the form of a laminated structure incorporates a breather filter section and a recirculation filter section. A hinge is incorporated in the laminated structure to allow the recirculation filter section to be moved relative to the breather filter section during installation of the filter assembly in a disk drive. A low permeability side of the breather filter section is disposed on the "environment" side of a filtering media to control access to the filtering media from the environment. A high permeability side of the breather filter section is disposed on the "drive side" of this filtering media to control access to the filtering media from within the interior of the drive.

36 Claims, 7 Drawing Sheets

DISK DRIVE WITH FLEXIBLE, INTEGRATED BREATHER/RECIRCULATION FILTER ELEMENTS

CROSS-REFERENCE TO RELATED APPLICATIONS

This patent application is a continuation-in-part of, and claims priority under 35 U.S.C. §120 to, U.S. patent application Ser. No. 10/731,423, that is entitled "DISK DRIVE WITH FLEXIBLE, INTEGRATED BREATHER/RECIRCULATION FILTER ELEMENTS," and that was filed on Dec. 9, 2003, and further claims priority under 35 U.S.C. §119(e) to U.S. Provisional Patent Application Ser. No. 60/432,157, that was filed on Dec. 10, 2002, and that is entitled "FLEXIBLE 4-IN-1 INTEGRATED CHEMICAL FILTER." (now abandoned) The entire disclosure of both of these patent applications is hereby incorporated by reference in their entirety herein.

FIELD OF THE INVENTION

The present invention generally relates to the field of disk drives and, more particularly, to filtering systems for disk drives.

BACKGROUND OF THE INVENTION

Various types of filters are used in disk drives. Breather filters are commonly used to filter an airflow into the disk drive through a breather port that extends through the disk drive housing (e.g., a hole in the cover; a hole in the base plate). Vapors are typically addressed by filters of this type, for instance by the breather filter utilizing an appropriate adsorbent. Oftentimes this airflow is directed through a meandering or tortuous path to provide a diffusion barrier of sorts, and then through the breather filter. These types of filters may also provide a filtering function for fluids within the interior of the disk drive.

Recirculation filters are also commonly included in disk drives. A fluid flow from within the disk drive is commonly directed through the recirculation filter, and then back into the disk drive. That is, recirculation filters are associated with an internal fluid flow within the disk drive. These types of filters may provide one or more of a chemical and mechanical filtering function.

Efforts continue to be directed to reducing the overall cost of the disk drive. Reducing the total number of parts can of course reduce the cost of the disk drive. Particulate and chemical filtering functions have been integrated into a single filter in the past. Moreover, filter designs exist that combine a breather filter section and a recirculation filter section. However, the need remains for such a multi-functional filter having a design that is adaptable to low cost mass production in an automated process, that has minimal packaging requirements, that may be shipped in a "flat" form and then manipulated into a different shape during installation, that is easy to install in the disk drive, and that may alleviate the need for a complex diffusion path.

BRIEF SUMMARY OF THE INVENTION

One aspect of the present invention is embodied by a data storage device having a breather filter, where the breather filter is disposed in a recess or well formed in a base plate or the like of the data storage device. Another aspect of the present invention is embodied by a breather filter for data storage device, where one side (e.g., the "drive side" or the "interior side") of the breather filter is more permeable than its opposite side (e.g., the "environment side" or "exterior side"). In both cases, a laminated or label-like, multi-layer disk drive filter assembly may include both a breather filter section and a recirculation filter section, where the breather filter section has a high permeability on the "drive side" and a low permeability on the environment side. These and other features will now be presented in more detail.

A first aspect of the present invention is embodied by a data storage device that includes a first housing section (e.g., a base plate) and a second housing section (e.g., a cover) that are appropriately interconnected to define an enclosed space. A computer-readable storage medium (e.g., one or more disks) is disposed in this enclosed space. Other structures associated with the data storage device (e.g., one or more actuator arms and associated head-gimbal assemblies; a voice coil, etc) may be disposed in this enclosed space as well, although such additional components are not required by the first aspect.

The first housing section in the case of the first aspect includes a first recess on an interior surface of the first housing section. A first port (e.g., a breather port) extends from this first recess to an exterior surface of the first housing section. A filter assembly used by the data storage device includes both a breather filter section and a recirculation filter section that are structurally interconnected. The breather filter section is disposed/extends within the first recess formed in the first housing section.

Various refinements exist of the features noted in relation to the first aspect of the present invention. Further features may also be incorporated in the first aspect of the present invention as well. These refinements and additional features may exist individually or in any combination. The first port may be of any appropriate configuration. In one embodiment, the first port is axially extending, while in another embodiment the first port meanders. The first port may interface with any appropriate portion of the interior surface of the first housing section within the first recess. One embodiment has the first port intersecting with a base associated with the first recess, while another embodiment has the first port intersecting with a perimeter-defining side wall associated with the first recess.

The breather filter section and the recirculation filter section of the filter assembly may be disposed in different orientations when installed in the data storage device of the first aspect. In one embodiment, the recirculation filter section is disposed at least generally perpendicular to the breather filter section when the filter assembly is installed in the data storage device. The breather filter section may be oriented so as to be at least generally parallel with the computer-readable storage medium. In one embodiment, the breather filter section is disposed under the computer-readable storage medium in at least somewhat of a horizontal orientation, while the recirculation filter section is disposed beyond the perimeter of the computer-readable storage medium, for instance in at least somewhat of a vertical orientation. Both the breather filter section and the recirculation filter section may be attached or anchored to or interface with the data storage device in any appropriate manner (e.g., via adhesive). It may be beneficial for the breather filter section to be at least generally flush with that portion of the first housing section that is disposed about the first recess in which the breather filter section is positioned, for instance so as to reduce its impact on the fluid flow within the data storage device during operation.

The breather filter section and the recirculation filter section are structurally interconnected in the case of the first aspect (e.g. disposed within a common "housing" or "packaging" of some sort, preferably by the filter assembly being in the form of a laminate or a laminated structure formed of multiple layers or sheets of one or more appropriate materials that are preferably flexible or compliant). A hinge of any appropriate type may be provided between the breather filter section and the recirculation filter section. In the case of the above-noted preferred laminated structure, this would allow the filter assembly to be shipped in a "flat" orientation, but yet still allow the recirculation filter section to be moved relative to the breather filter section (e.g., pivoted at least generally about the breather filter section) when installing the filter assembly in the data storage device. The above-noted hinge could then be in the form of a necked-down region in the laminated structure.

Both the breather filter section and the recirculation filter section may be of any appropriate configuration for the filter assembly used by the first aspect. In one embodiment, the breather filter section is at least generally wedge-shaped in plan view. That is, a pair of opposing sides or side edges of the breather filter section taper inwardly progressing from one end of the breather filter section toward the opposite end of the breather filter section. What may then be characterized as the wide end of the breather filter section may be located at an interconnection between the breather filter section and the recirculation filter section. In the case where the breather filter section is disposed under or beneath the computer-readable storage medium and where this computer-readable storage medium is in the form of a rotatable disk, this could then dispose the narrow end of the breather filter section closer to a rotational axis of the disk than the wide end of the breather filter section. Preferably, the breather filter section is disposed at or near the inner diameter of this disk in a low pressure region. The wide end of the breather filter section, the narrow end of the breather filter section, or both may have an arcuate contour or shape in plan view. For instance, the wide end of the breather filter section may extend between the opposing sides or side edges of the breather filter section at least generally parallel with a perimeter of the above-noted rotatable disk. The narrow end of the breather filter section may be disposed at least generally parallel with the wide end as well.

The breather filter section of the filter assembly utilized by the first aspect may include any appropriate filtering media and may provide any appropriate filtering function or combination of filtering functions. For instance, the filtering media for the breather filter section may provide a particle filtration function, an adsorption function, or both. In this regard, an adsorbent may be used as a filtering media for the breather filter section, for instance to provide both chemical and humidity control. Representative adsorbents that may be used for the filtering media of the breather filter section include without limitation, activated carbon, carbon tablets, silica gel tablets, carbon held in PTFE, carbon held on a web, and salt treatments for the adsorption of acid gases. The filtering media for the breather filter section may be in any appropriate form, may utilize any appropriate material(s), may include any appropriate combination of multiple filtering materials, or any combination of the foregoing.

The recirculation filter section of the filter assembly utilized by the first aspect may include any appropriate filtering media, and may provide any appropriate filtering function or combination of filtering functions. For instance, the recirculation filter section may provide a recirculation particle filtration function, an adsorption function, or both.

In one embodiment, the filtering media of the recirculation filter section may provide a mechanical filtering function, an electrostatic filtering function (e.g., so as to attract charged particles or such that there is an electrical interaction between the filtering media of the recirculation filter section and at least certain particulates that may exist within the data storage device), or both. The recirculation filter section could also use activated carbon or the like (e.g., an adsorbent), for instance to provide chemical and humidity control. Representative materials that may be used for the filtering media of the recirculation filter section for the filter assembly include without limitation activated carbon, carbon tablets, and salt treatments. In a preferred embodiment, the filtering media for the recirculation filter section is in the form of an electrostatic media. The filtering media for the recirculation filter section may be in any appropriate form, may utilize any appropriate material(s), may include any combination of multiple filtering materials, or any combination of the foregoing.

Preferably the entirety of the breather filter section that faces the first housing section is spaced from the first housing section in the case of the first aspect. This provides an enhanced access to the breather filter section by a flow emanating from outside the data storage device (and that is directed through the first port and into the noted open space between the first housing section and the breather filter section within the first recess). This flow may then be directed through any portion of the breather filter section that is exposed to this open space. A flow from the exterior may be directed into the breather filter section throughout a region having an area of about 1.91 cm$^2$ in one embodiment.

The first recess in the first housing section for the data storage device of the first aspect may be defined in any appropriate manner. In one embodiment, the first housing section includes a perimeter-defining side wall and a base that collectively define the first recess in which the breather filter section of the filter assembly is disposed. In one embodiment, the breather filter section is spaced from both the base and the perimeter-defining side wall of the first housing section that define the first recess. Stated another way, the breather filter section may be separated from the base of the first housing section by a first space, and further may be separated from the perimeter-defining side wall of the first housing section by an annular second space.

An appropriate seal may be provided between the first housing section and the filter assembly in the case of the first aspect, particularly in relation to the breather filter section. In one embodiment, an annular seal is provided about the perimeter of the breather filter section. That is, "about" means that no portion of the seal is disposed over the breather filter section in this case. This would then force any flow from outside the data storage device to first pass through the filtering media of the breather filter section before entering the interior of the data storage device. Another benefit of this type of seal is that the seal itself does not reduce the area through which this flow may proceed through any packaging associated with the breather filter section to reach the filtering media of the breather filter section. This seal may be accomplished in any appropriate manner, including an adhesive that is appropriate for use in a data storage device environment. The adhesive may be in the form of a layer formed on the laminated structure that may include the breather filter section and the recirculation filter section. A removable layer, film, cover or the like may be provided to expose the adhesive before installing the filter assembly on the first housing section.

In one embodiment of the first aspect, the "interior" side of the breather filter section (that side through which a flow from an interior of the data storage device is directed into the filtering media of the breather filter section) has a different permeability than the "exterior" side of the breather filter section (that side through which a flow from the external environment is directed into the filtering media of the breather filter section). Stated another way, the two primary sides of the breather filter section through which a flow is directed to its filtering media provide a different resistance to flow. For instance, the interior side of the breather filter section may have a larger or higher permeability than the exterior side of the breather filter section. That is, the breather filter section may be configured such that there is less resistance to a flow emanating from within the data storage device to the filtering media of the breather filter section, than to a flow to the filtering media of the breather filter section emanating from outside of the data storage device. In one embodiment, the interior side of the breather filter section may be characterized as having a high permeability, while the exterior side of the breather filter section may be characterized as having a low permeability. The exterior side of the breather filter section that interfaces with the environment does, however, allow for at least some flow from the environment to the filtering media of the breather filter section. The interior side of the breather filter section is at least twice as permeable as the exterior side of the breather filter section in one embodiment, and the interior side of the breather filter section is at least about ten times as permeable as the exterior side of the breather filter section in another embodiment.

The recirculation filter section may be configured for controlling the flow to its filtering media in the case of the first aspect as well. In one embodiment, the permeability of both primary sides of the recirculation filter section through which a flow is directed to its filtering media is high (e.g., the same as the permeability as the "interior" side of the breather filter section).

In one embodiment, the data storage device of the first aspect is what is commonly referred to in the art as a disk drive. Disk drives of any appropriate configuration may utilize the filter assembly that is used by the first aspect. The filter assembly described in relation to the first aspect may be appropriate for various other applications, and therefore may be presented without any application-specific limitations.

A second aspect of the present invention is embodied by a data storage device that includes a first housing section (e.g., a base plate) and a second housing section (e.g., a cover) that are appropriately interconnected to define an enclosed space. A first port (e.g., a breather port) extends from an exterior surface of the first housing section to an interior surface of the first housing section to provide a fluid connection between the environment and the interior of the data storage device. A computer-readable storage medium (e.g., one or more disks) is disposed in the enclosed space. Other structures associated with the data storage device (e.g., one or more actuator arms and associated head-gimbal assemblies; a voice coil, etc.) may be disposed within the enclosed space as well, although such additional components are not required by the second aspect.

A filter assembly used by the data storage device of the second aspect includes both a breather filter section and a recirculation filter section that are structurally interconnected. Generally, the breather filter section is disposed within a fluid path extending between an interior and an exterior of the data storage device, while the recirculation filter section is disposed within a fluid path that is entirely contained within an interior of the data storage device. The permeability of the breather filter section is different on the opposite sides of a filtering media that is used by the breather filter section. Specifically, the interior side of the breather filter section (through which a flow from the interior of the data storage device progresses to reach the filtering media of the breather filter section) has a different permeability than the exterior side of the breather filter section (through which a flow from the environment or exterior of the data storage device progresses to reach the filtering media of the breather filter section).

Various refinements exist of the features noted in relation to the second aspect of the present invention. Further features may also be incorporated in the second aspect of the present invention as well. These refinements and additional features may exist individually or in any combination. Initially, the various features of the filter assembly discussed above in relation to the first aspect may be used by the filter assembly of this second aspect, individually or in any combination. In one embodiment, the data storage device of the second aspect is what is commonly referred to in the art as a disk drive. Disk drives of any appropriate configuration may utilize the filter assembly that is used by the second aspect.

A third aspect of the present invention is directed to a disk drive filter assembly in the form of a multi-layered structure that includes both a breather filter section and a recirculation filter section that are structurally interconnected. Generally, the breather filter section is disposed within a fluid path extending between an interior and an exterior of the disk drive, while the recirculation filter section is disposed within a fluid path that is entirely contained within an interior of the disk drive. One side of the breather filter section is at least twice as permeable as the opposite side of the breather filter section. The various features of the filter assembly discussed above in relation to the first aspect may be used by this third aspect, individually or in any combination.

DETAILED DESCRIPTION OF THE INVENTION

Figure 1:
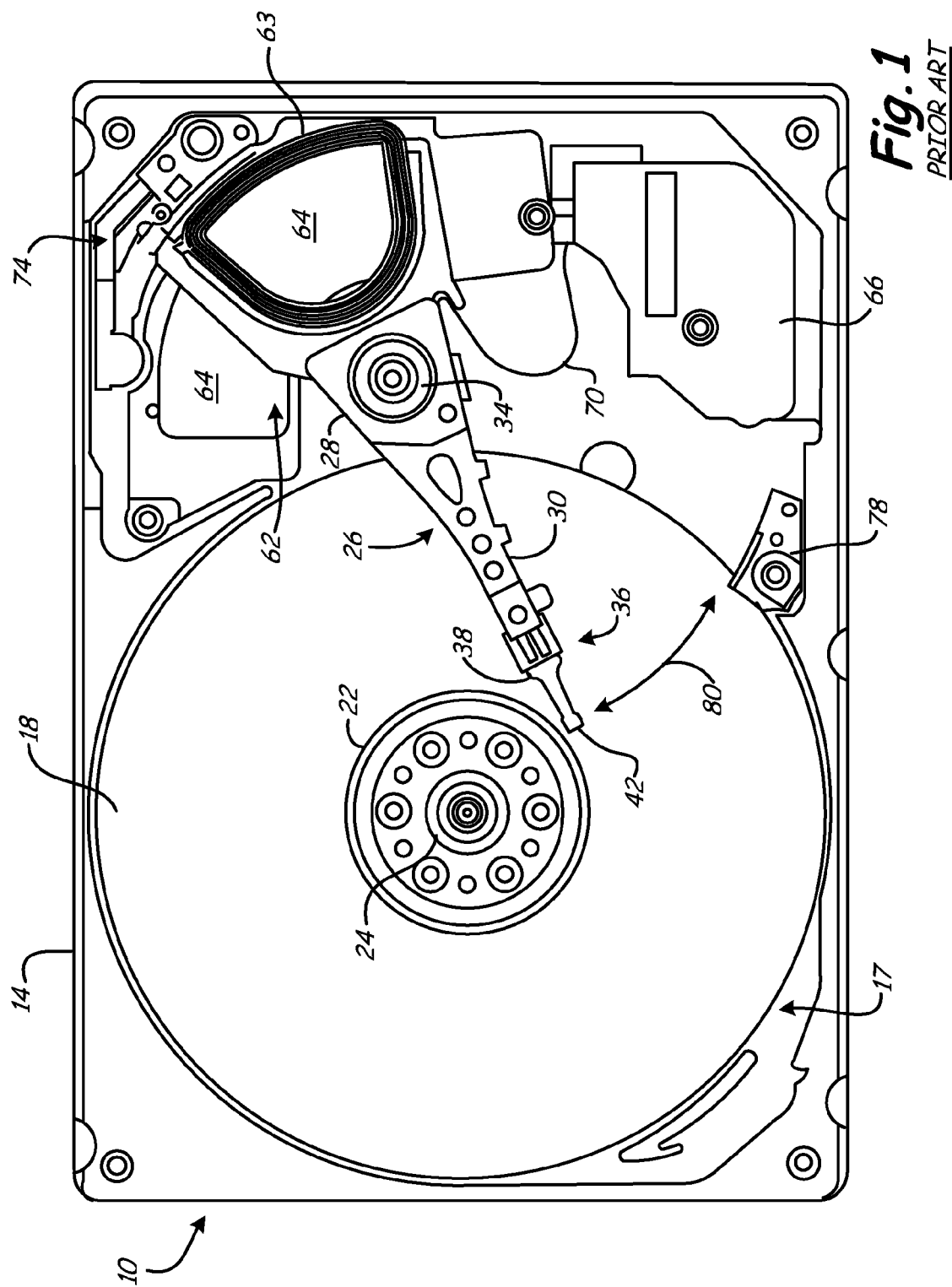
FIG. 1 is a top or plan view of a prior art disk drive that may be adapted to include a multi-functional filter assembly of the type presented herein.
Figure 2:
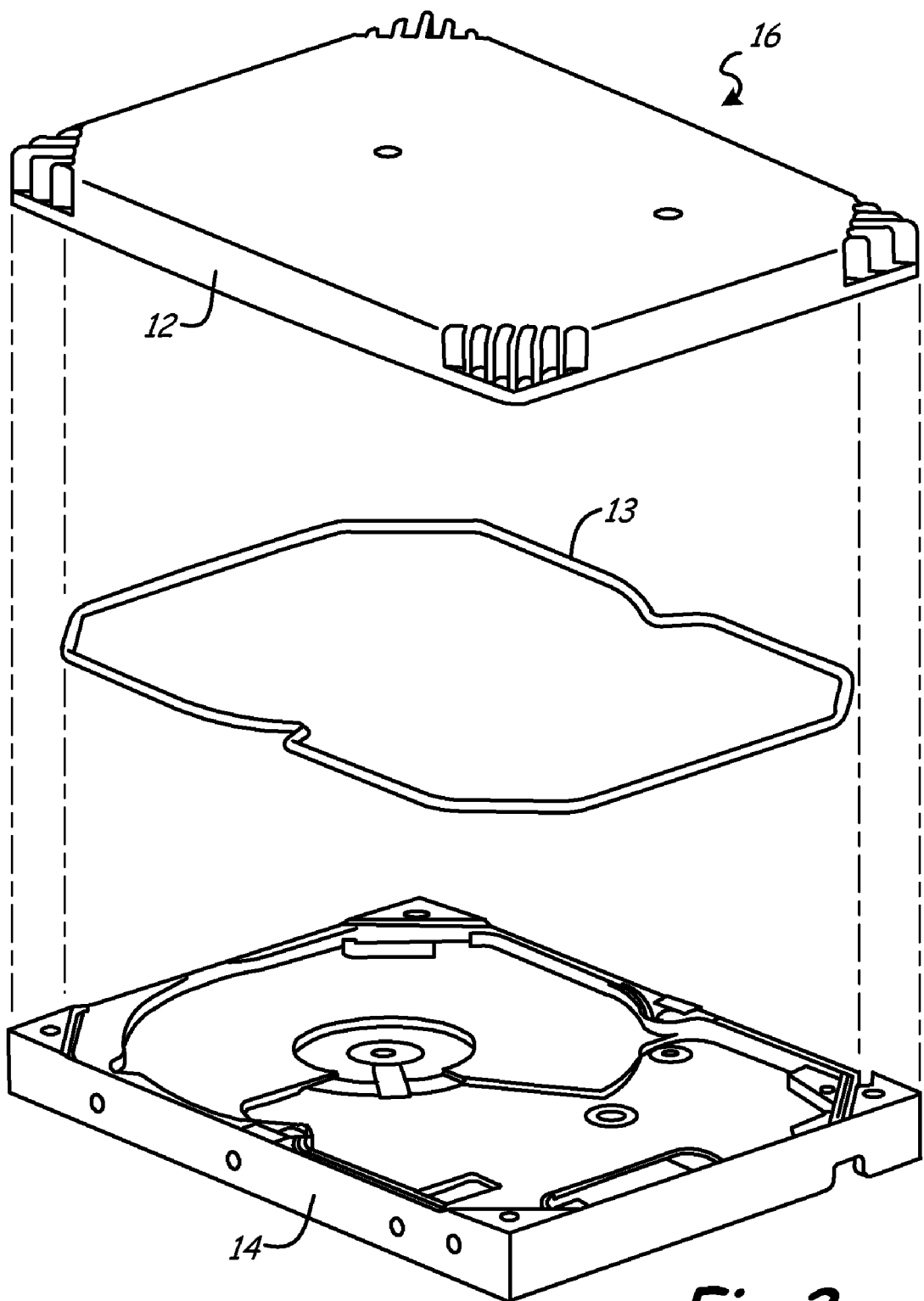
FIG. 2 is an exploded, perspective view of a prior art disk drive housing that may be utilized by the disk drive of FIG. 1.

One embodiment of a prior art disk drive 10 is illustrated in FIGS. 1-4. However, this disk drive 10 may be adapted to incorporate a multi-functional filter assembly of the type described herein, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub or spindle 22, which in turn is rotatably interconnected with the disk drive base plate 14 and/or cover 12. Multiple data storage disks 18 would be mounted in vertically spaced and parallel relation on the spindle 22 and may be characterized as a hard disk assembly or HDA 17. Rotation of the disk(s) 18 is provided by a spindle motor 24 that is appropriately coupled to the spindle 22 to simultaneously spin the data storage disk(s) 18 at an appropriate rate.

The disk drive 10 also includes head stack assembly or HSA 26, that in turn includes one or more individual rigid actuator arms 30. All actuator arms 30 extend out from an actuator body 28. This actuator body 28 is mounted on a pivot bearing 34. Each actuator arm 30 pivots about the pivot bearing 34, which in turn is rotatably supported by the base plate 14 and/or cover 12. Multiple actuator arms 30 would be disposed in vertically spaced relation, with one actuator arm 30 typically being provided for each major data storage surface of each data storage disk 18 of the disk drive 10. Other actuator arm configurations could be utilized as well, such as an "E" block having one or more rigid actuator arm tips or the like that cantilever from a common structure. Unless otherwise noted herein, the term "actuator arm" encompasses both an actuator arm and an actuator arm tip.

Movement of each actuator arm 30 is provided by an appropriate head stack assembly drive, such as a voice coil motor 62 or the like. The voice coil motor 62 may be characterized as a rotary drive. The voice coil motor 62 is a magnetic assembly that controls the movement of each of the actuator arms 30 under the direction of control electronics 66. Typical components of the voice coil motor 62 are a coil 63 that may be mounted on one of the actuator arms 30 or structure pivotable therewith (e.g., on structure interconnected with the actuator body 28), and a separate magnet 64 that is disposed above and below this coil 63 (the upper magnet not being shown in FIG. 1). The magnets 64 will typically be mounted on the housing 16. Any appropriate head stack assembly drive type may be utilized by the disk drive 10, including a linear drive (for the case where each of the actuator arms 30 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the HSA 28. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the actuator arm assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 along a path 80 and "across" the corresponding data storage disk 18 to position the head 44 at the desired/required radial position on the disk 18 (i.e., at the correct track on the data storage disk 18) for disk drive read/write operations.

When the disk drive 10 is not in operation, the actuator arm(s) 30 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk 18 in the illustrated configuration to typically both move the corresponding slider 42 vertically away from its corresponding data storage disk 18 and to also exert somewhat of a retaining force on the corresponding actuator arm 30. Any configuration for the ramp assembly 78 that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 includes an actuator arm assembly latch 74 that moves from a non-latching position to a latching position to engage an actuator arm 30 so as to preclude the same from pivoting in a direction which would tend to drag the slider(s) 42 across its corresponding data storage disk 18.

Figure 3:
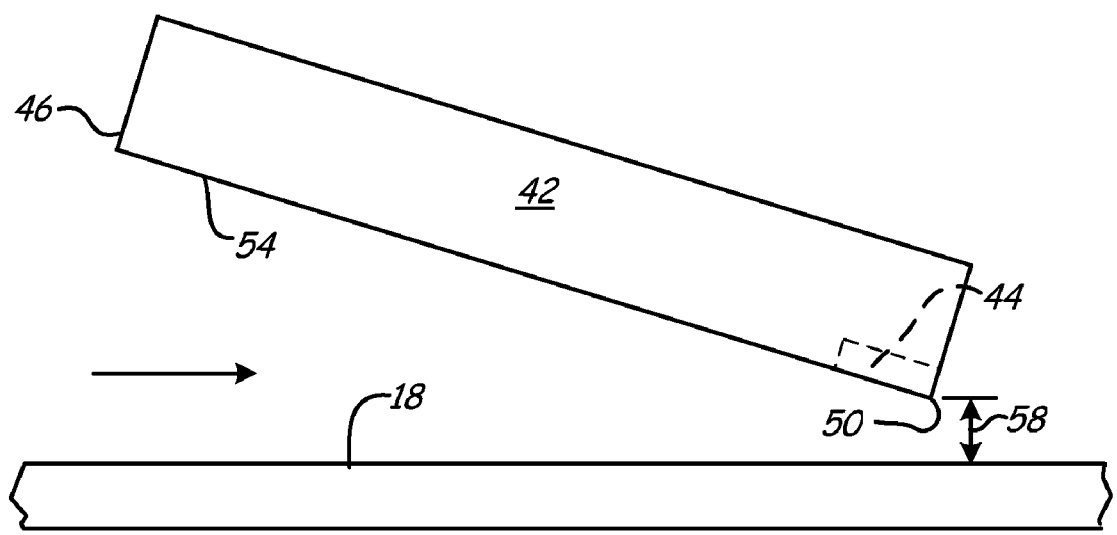
FIG. 3 is a side view of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
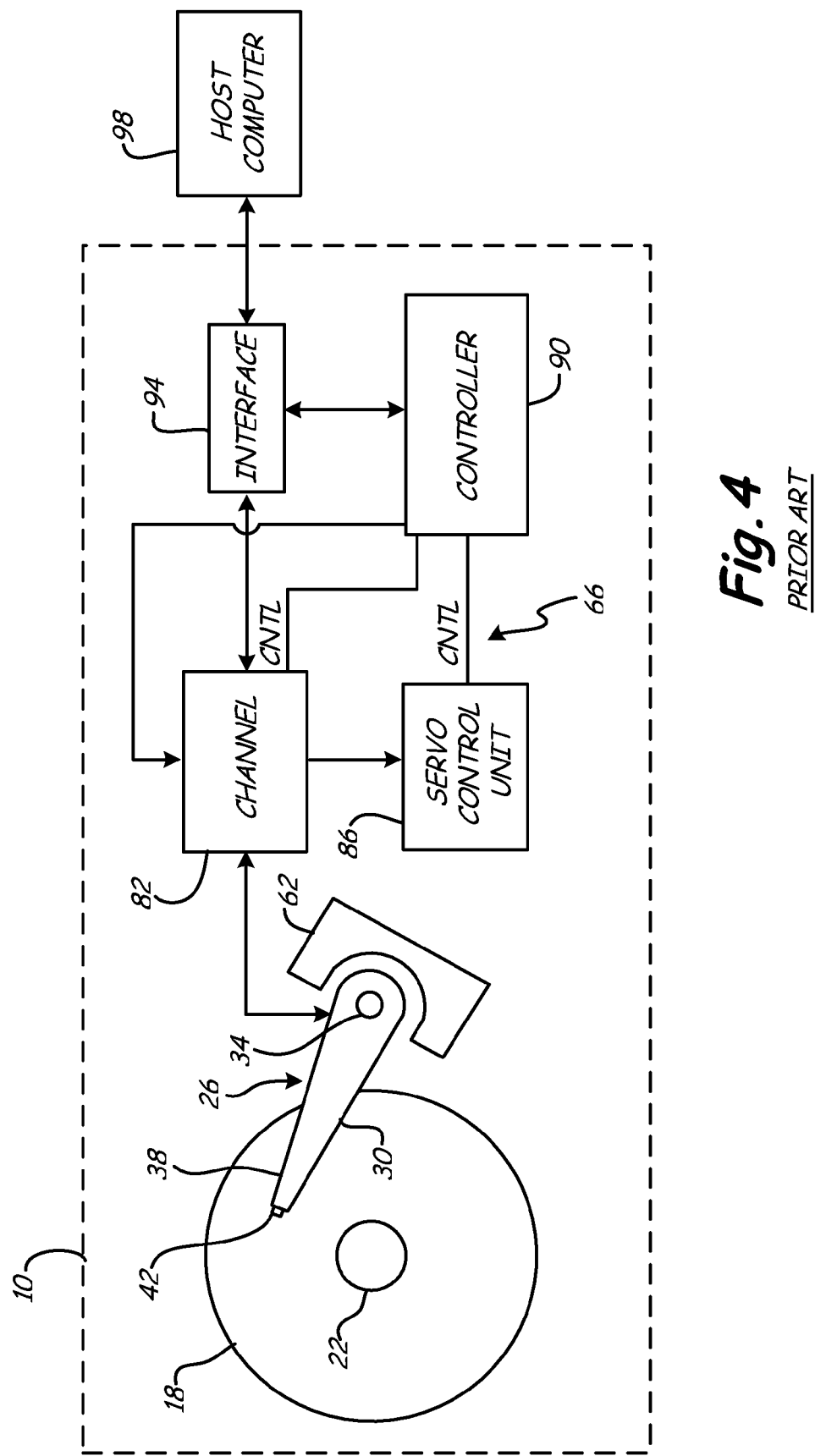
FIG. 4 is a simplified, prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
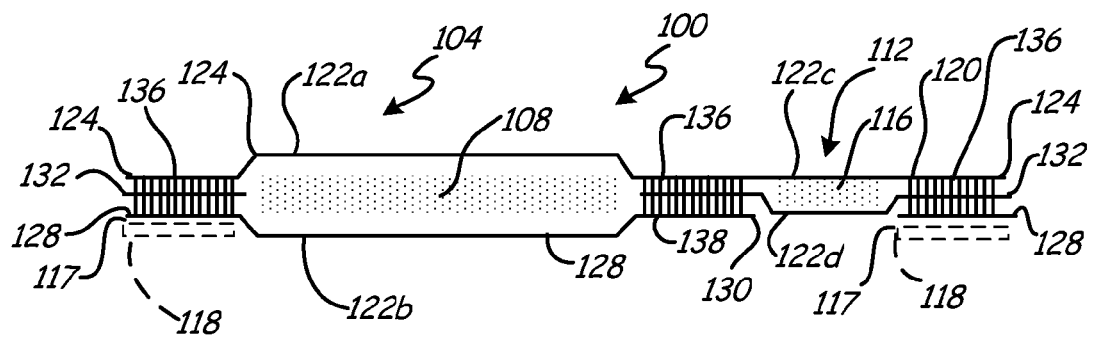
FIG. 5 is a cross-sectional view of one embodiment of a multi-functional filter assembly that may be used by a disk drive, including the disk drive of FIG. 1.

One embodiment of a multi-functional filter assembly that may be used by the disk drive 10 of FIG. 1, as well as other disk drive configurations, is illustrated in FIG. 5 and is identified by reference numeral 100. There are two main parts to the filter assembly 100, namely a breather filter section 104 and a recirculation filter section 112. Both the breather filter section 104 and the recirculation filter section 112 are incorporated in a laminate or laminated structure 120. Generally, the breather filter section 104 provides a filtering function for any fluid communication between the interior and the exterior of a disk drive that utilizes the filter assembly 100. The recirculation filter section 112, on the other hand, provides a filtering function within the interior of a disk drive that utilizes the filter assembly 100. That is, the recirculation filter section 112 filters an internal flow within a disk drive that utilizes the filter assembly 100.

The breather filter section 104 includes any appropriate filtering media 108 for a breather filter application for a disk drive. The breather filter section 104 may provide any appropriate filtering function or combination of filtering functions. For instance, the breather filter section 104 may provide a particle filtration function, an adsorption function, or both. In this regard, the filtering media 108 may include an adsorbent for the breather filter section 104 to provide chemical and humidity control. Representative adsorbents that may be used for the filtering media 108 include without limitation activated carbon, carbon tablets, silica gel tablets, carbon held in PTFE, carbon held on a web, and salt treatments for the adsorption of acid gases. The filtering media 108 may be in any appropriate form, may utilize any appropriate material(s), may include any appropriate combination of multiple filtering materials, or any combination of the foregoing.

The recirculation filter section 112 includes any appropriate filtering media 116 for a recirculation filter application for a disk drive. The recirculation filter section 112 may provide any appropriate filtering function or combination of filtering functions. For instance, the recirculation filter section 112 may provide a recirculation particle filtration function. In this regard, the filtering media 116 may provide a mechanical filtering function, an electrostatic filtering function (e.g., so as to attract charged particles or such that there is an electrical interaction between the filtering media 116 and at least certain particulates within a disk drive that utilizes the filter assembly 100), or both. In a preferred embodiment, the filtering media 116 is in the form of an electrostatic media that is appropriate for disk drive recirculation filter applications. The recirculation filter section 112 may include activated carbon or the like (e.g. an adsorbent) as well, for instance to provide chemical and humidity control. The filtering media 116 may be in any appropriate form in the recirculation filter section 112, may utilize any appropriate material(s), may include any combination of multiple filtering materials, or any combination of the foregoing.

The breather filter section 104 and the recirculation filter section 112 are structurally incorporated in the laminated structure 120. One function of one or more layers of the laminated structure 120 is to contain the filtering media 108 of the breather filter section 104, as well as the filtering media 116 of the recirculation filter section 112. Any appropriate material or combination of materials that will suitably retain the filtering media 108 of the breather filter section 104, as well as the filtering media 116 of the recirculation filter section 112, may be a candidate for one or more layers of the laminated structure 120 (e.g., scrim). However, a flow control function provided by one or more layers of the laminated structure 120 (discussed below) may have an impact on material selection and/or the configuration of such layers.

In a preferred embodiment, the laminated structure 120 is pliable or flexible (e.g., formed by one or more sheets of one or more materials) to facilitate installation of the filter assembly 100 into a disk drive in a manner that will be discussed in more detail below. Generally, the filter assembly 100 of FIG. 5 may be characterized as a laminated or layered structure that is sufficiently flexible such that the recirculation filter section 112 may be moved (e.g., pivoted) into an orientation where the recirculation filter section 112 is at least generally perpendicular to the breather filter section 104. This would also allow for shipment of the filter assembly 100 in a "flat" condition, and thereafter allow the same to be "bent" into the desired configuration when installed in a disk drive. Another characterization of the laminated structure 120 is that it provides a "label" or "label-like" configuration for the filter assembly 100. Certain aspects of the filter assembly 100 are not contingent upon this "flexible" nature of the packaging 120.

Components of the laminated structure 120 for the case of the illustrated embodiment include an upper layer or sheet 124, a lower layer or sheet 128, and at least one intermediate layer or sheet 132 that is disposed between the upper layer 124 and the lower layer 128. The upper layer 124, intermediate layer(s) 132, and lower layer 128 may be joined together at locations 136 to define a perimeter for both the breather filter section 104 and the recirculation filter section 112. Any way of joining these layers 124, 132, and 128 may be utilized, including without limitation adhesives, welding, heat sealing or thermal bonding, and ultrasonic bonding. Moreover, the upper layer 124, intermediate layer(s) 132, and lower layer 128 may be joined together to define a hinge 138 in the laminated structure 120 to facilitate pivoting/rotating the recirculation filter section 112 relative to/about the breather filter section 104 when installing the filter assembly 100 in a disk drive. Any way of configuring the laminated structure 120 to allow the recirculation filter section 112 to be moved relative to the breather filter section 104 during installation may be utilized. For instance, the hinge 138 may be of any appropriate configuration.

Another function provided by one or more layers of the laminated structure 120 is controlling the flow to the filtering media 108 of the breather filter section 104 from both the drive or interior side and from the environment or exterior side. There is somewhat of a key relationship between the upper layer 124 and the lower layer 128 of the laminated structure 120 at least in relation to the breather filter section 104 and control of its related flow. Generally, at least those portions of the upper layer 124 and the lower layer 128 that are disposed over the filtering media 108 of the breather filter section 104 have a different porosity or permeability. The upper layer 124 will face the interior of a disk drive that utilizes the filter assembly 100, while the lower layer 128 will face at least generally away from the interior of the disk drive. Typically, the lower layer 128 will face a base plate of a disk drive that utilizes the filter assembly 100. In any case, a flow emanating from inside the disk drive will first pass through the upper layer 124 before reaching the filtering media 108 of the breather filter section 104, while a flow emanating from the environment will first pass through the lower layer 128 before reaching the filtering media 108 of the breather filter section 104.

At least that portion of the lower layer 128 that is disposed over the filtering media 108 of the breather filter section 104 is less porous or has a lower permeability than at least that portion of the upper layer 124 that is disposed over the filtering media 108 of the breather filter section 104. That is, there is less resistance to a flow entering the filtering media 108 of the breather filter section 104 through the upper layer 124 (from inside the disk drive) than to a flow entering the filtering media 108 of the breather filter section 104 through the lower layer 128 (from outside the disk drive). It will typically be preferred that the resistance to flow through the upper layer 124 to the filtering media 108 of the breather filter section 104 be as low as possible.

There are a number of ways in which the above-noted flow characteristics to the filtering media 108 of the breather filter section 104, may be characterized. One is that the portion of the upper layer 124 associated with the filtering media 108 of the breather filter section 104 is at least about two times more permeable than the portion of the lower layer 128 associated with this same filtering media 108 in one embodiment. Another is that the portion of the upper layer 124 associated with the filtering media 108 of the breather filter section 104 is at least about ten times more permeable than the portion of the lower layer 128 associated with this same filtering media 108 in another embodiment. Yet another is that the pressure drop proceeding through the upper layer 124 to the filtering media 108 of the breather filter section 104 from the drive side is low compared to the pressure drop proceeding through the lower layer 128 to the filtering media 108 of the breather filter section 104 from the environment side. Ideally, there would be little to no pressure drop proceeding through the upper layer 124 to the filtering media 108 of the breather filter section 104 from the drive side.

The illustrated embodiment discloses a single layer to control the flow to the filtering media 108 of the breather filter section 104 from each side (i.e., from the drive side, and from the environment side). This is by no means a requirement of the filter assembly 100. For instance, the laminated structure 120 could be in the form of one or more layers disposed on the drive side of the filtering media 108 of the breather filter section 104, and one or more layers on the environment side of the filtering media 108 of the breather filter section 104 so as to have the drive side of the breather filter section 104 be more porous or permeable than the environment side of the breather filter section 104. Continuing with the foregoing, the breather filter section 104 may more generally be characterized as including: 1) a high permeability side 122*a* through which a flow be directed to the filtering media 108 of the breather filter section 114 from inside the disk drive; and 2) a low permeability side 122*b* through which a flow may be directed to the filtering media 108 of the breather filter section 104 from outside or external to the disk drive. That is, the high permeability side 122*a* of the breather filter section 104 will have the above-noted characteristics of the upper layer 124 of the laminated structure 120, while the low permeability side 122b of the breather filter section 104 will have the above-noted characteristics of the lower layer 128 of the laminated structure 120. Another characteristic of note in relation to the breather filter section 104 relates to the area through which a flow may be directed to reach its filtering media 108. Generally, the surface area of that region through which a flow may be directed through the lower layer 128 to the filtering media 108 of the breather filter section 104 is relatively large. In one embodiment, the surface area of the region of the laminated structure 120 through which a flow emanating from outside the drive may be directed through the laminated structure 120 to reach the filtering media 108 of the breather filter section 104 is about 1.91 cm$^2$ in one embodiment. Preferably, a flow emanating from outside the disk drive may proceed through the laminated structure 120 throughout at least substantially the entire region of the laminated structure 120 that is disposed over the filtering media 108 of the breather filter section 104. Stated another way, a flow emanating from outside the disk drive preferably may proceed through a majority of the laminated structure 120 that overlies the filtering media 108 of the breather filter section 104.

The filtering media 116 for the recirculation filter section 112 of the filter assembly 100 is contained between the upper layer 124 and the intermediate layer 132 of the laminated structure 120. An aperture 130 exists in that portion of the low permeability lower layer 128 of the laminated structure 120 that is disposed over the filtering media 116 of the recirculation filter section 112. The upper layer 124 and the intermediate layer 132 of the laminated structure 120 contain the filtering media 116 for the recirculation filter section 112. The upper layer 124 and the intermediate layer 132 also at least in part control the flow through the filtering media 116 of the recirculation filter section 112. Generally, the portion of the upper layer 124 and intermediate layer 132 that are disposed over the filtering media 116 of the recirculation filter section 112 are porous or of a high permeability to facilitate flow through the recirculation filter section 112 (e.g., to provide a low flow resistance). Stated another way, there is preferably a low pressure drop proceeding through both the upper layer 124 and the intermediate layer 132 to reach/exit the filtering media 116 of the recirculation filter section 112. Since the upper layer 124 is disposed over both the filtering media 108 of the breather filter section 104 and the filtering media 116 of the recirculation filter section 112, the characteristics of the upper layer 124 discussed above in relation to the breather filter section 104 are equally applicable to the upper layer 124 in relation to the recirculation filter section 112. Although the same upper layer 124 is disposed over both the filtering media 108 in the breather filter section 104, and over the filtering media 116 in the recirculation filter section 112 (e.g., for ease of manufacturing), such need not be the case. Typically the porosity or permeability of the intermediate layer 132 will be at least generally the same as that of the upper layer 124. However, the opposing sides of the recirculation filter section 112 (e.g., on the inlet corresponding with the upper layer 124, and on the exit side corresponding with the intermediate layer 132 in the case of the recirculation filter section 112) may be of any appropriate porosity or permeability.

The illustrated embodiment discloses a single layer to control the flow through the filtering media 116 of the recirculation filter section 112 from each side. This is by no means a requirement of the filter assembly 100. Instead, the laminated structure 120 over both sides of the filtering media 116 of the recirculation filter section 112 may be of any configuration that provides a desired flow through the filtering media 116 of the recirculation filter section 112. For instance, the laminated structure 120 could be in the form of one or more layers disposed on the "inlet" side of the filtering media 116 of the recirculation filter section 112, and one or more layers on the "outlet" side of the filtering media 116 of the recirculation filter section 112 so as to provide desired flow characteristics through the recirculation filter section 112 of the filter assembly 100. As such, the recirculation filter section 112 for the filter assembly 100 may be more generally characterized as including: 1) a high permeability side 122c through which a flow be directed to the filtering media 116 of the recirculation filter section 112; and 2) a high permeability side 122d through which a flow may be directed out of the recirculation filter section 112 and back into the interior of the disk drive. That is, the high permeability side 122c and high permeability side 122d of the recirculation filter section 112 may have the above-noted characteristics of the upper layer 124 of the laminated structure 120.

Based upon the foregoing and in one embodiment, the upper layer 124, the lower layer 128, and the intermediate layer 132 of the laminated structure 120 each may be in the form of a scrim of the desired porosity or permeability. Other layers could be included in the laminated structure 120 as well and for any appropriate purpose. For instance, the laminated structure 120 about the perimeter of each of the breather filter section 104 and the recirculation filter section 112 could included an appropriate "stiffening" layer (not shown).

An adhesive layer 117 may be provided on the laminated structure 120 for the filter assembly 100 and as illustrated by the dashed lines in FIG. 5. This adhesive layer 117 is disposed about at least part of the breather filter section 104. That is, the adhesive layer 117 may be disposed on the laminated structure 120 about the entire perimeter of the breather filter section 104, or the adhesive layer 117 may be disposed on the laminated structure 120 intermittently about the perimeter of the breather filter section 104. An annular seal is preferred to increase the potential that all flow from outside the disk drive is directed through the filtering media 108 for the breather filter section 104. In any case, an appropriate removable layer, film, cover or the like 118 may be disposed over the adhesive layer 117, and may be peeled away or removed to expose the adhesive layer 117 for installation of the filter assembly 100 in a disk drive. In any case, no portion of the adhesive layer 117 overlies the breather filter section 104. Stated another way, the adhesive layer 117 is disposed beyond the perimeter of the breather filter section 104. Therefore, the adhesive layer 117 does not limit a flow through the low permeability side 122b of the breather filter section 104 to the filtering media 108 of the breather filter section 104. The adhesive layer 117 is also on the side of the laminated structure 120 having the low permeability side 122b of the breather filter section 104. As will be discussed in more detail below, this "side" of the filter assembly 100 may be disposed within a recess formed in a base plate of a disk drive that utilizes the filter assembly 100. The adhesive layer 117 may also be disposed about at least part of the recirculation filter section 112 as well and as illustrated in FIG. 5. The adhesive could also be separately applied to the laminated structure 120 and/or corresponding portions of the disk drive prior to installing the filter assembly 100 in the disk drive.

Figure 6:
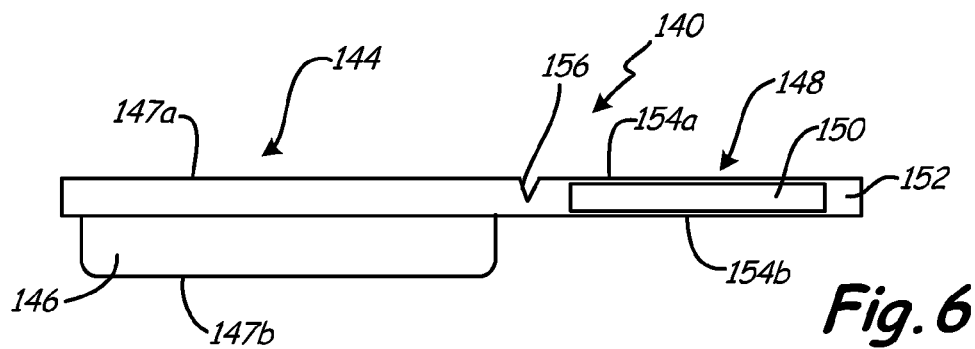
FIG. 6 is a side view of another embodiment of a multi-functional filter assembly that may be used by a disk drive, including the disk drive of FIG. 1.
Figure 7:
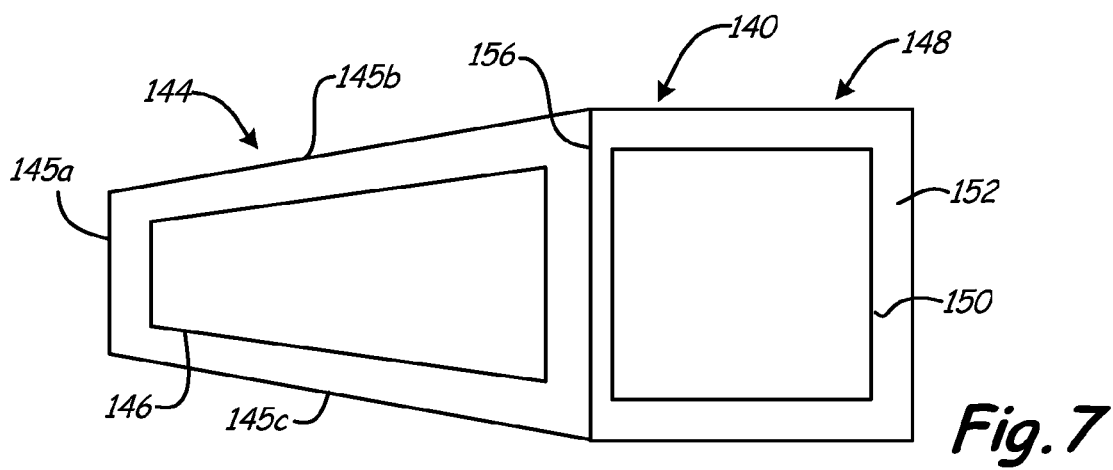
FIG. 7 is a top view of the multi-functional filter assembly of FIG. 6.

Another embodiment of a filter assembly is schematically illustrated in FIGS. 6-7, and is identified by reference numeral 140. The filter assembly 140 may be configured in the same manner as the filter assembly 100 discussed above in relation to FIG. 5 (e.g., the cross-sectional configuration of the filter assembly 140 may be the same as that of the filter assembly 100, including using the same layered construction). Generally, the filter assembly 140 includes a breather filter section 144 having a filtering media 146, as well as a recirculation filter section 148 having a filtering media 150. Both the breather filter section 144 and the recirculation filter section 148 are structurally interconnected by the filter assembly 140 being in the form of a laminate or laminated structure 152. A hinge 156 is formed in the laminated structure 152 to facilitate movement of the recirculation filter section 148 relative to the breather filter section 144 when installing the filter assembly 140 in a disk drive. The hinge 156 may be of any appropriate configuration that allows for the described relative movement.

Like the filter assembly 100 of FIG. 5, the breather filter section 144 includes a high permeability side 147a on the "drive side" of the filtering media 146 for the breather filter section 144, and a low permeability side 147b on the "environment side" of the filtering media 146 for the breather filter section 144. That is, there is less resistance to a flow proceeding through the high permeability side 147a of the breather filter section 144 to its filtering media 146 of the breather filter section 144 (i.e., a flow emanating from inside the disk drive) than to a flow proceeding through the low permeability side 147b of the breather filter section 144 to its filtering media 146 (i.e., a flow emanating from the environment, or external to the disk drive). The various characteristics presented above in relation to the filter assembly 100 are thereby equally applicable to the filter assembly 140, including without limitation the various ways discussed above for quantifying these flow characteristics.

The breather filter section 144 of the filter assembly 140 is at least generally wedge-shaped in plan view and as illustrated in FIG. 7. That is, the opposing side edges 145b, 145c taper at least generally toward each other progressing from the end of the breather filter section 144 proximate the hinge 156, in a direction of the opposite end 145a associated with the breather filter section 144. The function provided by this profile is to maximize the breathable surface area and to accommodate a desired quantity of filtering media 146 (e.g., carbon amounts).

Like the filter assembly 100 of FIG. 5, the recirculation filter section 148 includes a high permeability side 154a on the "inlet side" to the filtering media 150 for the recirculation filter section 148, and a high permeability side 154b on the "outlet side" from the filtering media 150 for the recirculation filter section 148. The various characteristics presented above in relation to the filter assembly 100 are thereby equally applicable to the filter assembly 140, including without limitation the various ways discussed above for quantifying the flow characteristics through the recirculation filter section 112.

Figure 8:
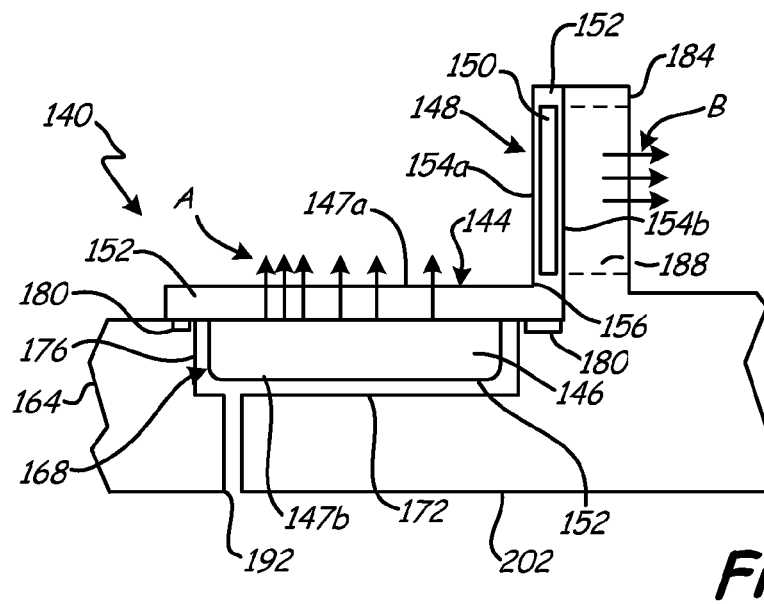
FIG. 8 is a cutaway, side view of the multi-functional filter assembly of FIG. 6 installed in one embodiment of a base plate for a disk drive.

FIG. 8 depicts the filter assembly 140 as installed on one embodiment of a base plate 164 that may be used by a disk drive, including without limitation the disk drive 10 of FIG. 1. The base plate 164 includes a recess 168 for receiving the breather filter section 144 of the filter assembly 140. This recess 168 is defined by a base 172 and a perimeter-defining side wall 176. A breather port 192 extends from an exterior surface 202 of the base plate 164 and intersects with the recess 168. In the illustrated embodiment, the breather port 192 is an axially extending aperture that intersects with the base 172 of the recess 168. Moreover, the breather port 192 is disposed directly under a perimeter portion of the breather filter section 144 of the filter assembly 140. The breather port 192 may be disposed at any appropriate location of the base plate 164 so as to extend between any part of the exterior surface 202 of the base plate 164 and the recess 168.

There are a number of notables in relation to the positioning of the breather filter section 144 of the filter assembly 140 within the recess 168 of the base plate 164. One is that the low permeability side 147b of the breather filter section 144 faces the base plate 164, and further is disposed in spaced relation to the base 172 that defines part of the recess 168. That is, a space separates the entirety of the base 172 associated with the base plate 164 from the breather filter section 144. Therefore, a flow progressing through the breather port 192 from outside the disk drive and into the recess 168 may flow through any portion of the low permeability side 147b of the breather filter section 144 that overlies the filtering media 146 of the breather filter section 144. As noted above in relation to the FIG. 5 embodiment, the surface area of the region through which a flow may proceed through the low permeability side 147b to reach the filtering media 146 of the breather filter section 144 is about 1.91 $cm^2$ in one embodiment. This provides enhanced access to the filtering media 146 of the breather filter section 144 from outside the drive and in a flow that is in the direction of the arrows A.

The perimeter of the breather filter section 144 for the filter assembly 140 is also disposed in spaced relation to the perimeter-defining side wall 176 of the recess 168 in the base plate 164. That is, a space separates the entirety of the perimeter-defining side wall 176 of the base plate 164 from the perimeter of the breather filter section 144. Fluid within the recess 168 may then also flow into the breather filter section 144 through the perimeter of the breather filter section 144 as well. The laminated structure 152 over this perimeter portion or annular side of the breather filter section 144 will typically be of the same permeability as the low permeability section 147b of the laminated structure 152.

An appropriate seal 180 between the base plate 164 and the laminated structure 152 of the filter assembly 140 may be disposed about the recess 168 so as to force at least a substantial portion of, and more preferably the entirety of, a flow from outside the drive through the filtering media 146 of the breather filter section 144 for the filter assembly 140. The filter assembly 140 may be fixed to the base plate 164 about the recess 168 as well. In one embodiment, an appropriate adhesive is used to attach the filter assembly 100 to the base plate 164, and this adhesive is disposed entirely beyond the recess 168. Stated another way, no adhesive limits or interferes with the flow into the breather filter section 144 of the filter assembly 140 in the same manner discussed above in relation to the FIG. 5 embodiment.

The base plate 164 also includes a shroud wall 184 for interfacing with the recirculation filter section 148. The shroud wall 184 supports the recirculation filter section 148 in an orientation that is at least generally perpendicular to the breather filter section 144 of the filter assembly 140. An aperture 188 extends through the shroud wall 184 and is aligned with the filtering media 150 of the recirculation filter section 148. As such, a flow from within the disk drive is able to proceed through the filtering media 150 for the recirculation filter section 148, and then through the aperture 188 in the shroud wall 184, at least generally in the direction of the arrows B in FIG. 8. An adhesive may be used to anchor or attach the recirculation filter section 148 to the shroud wall 184. Any appropriate way of maintaining the recirculation filter section 148 of the filter assembly 100 in a proper orientation may be utilized.

Figure 9:
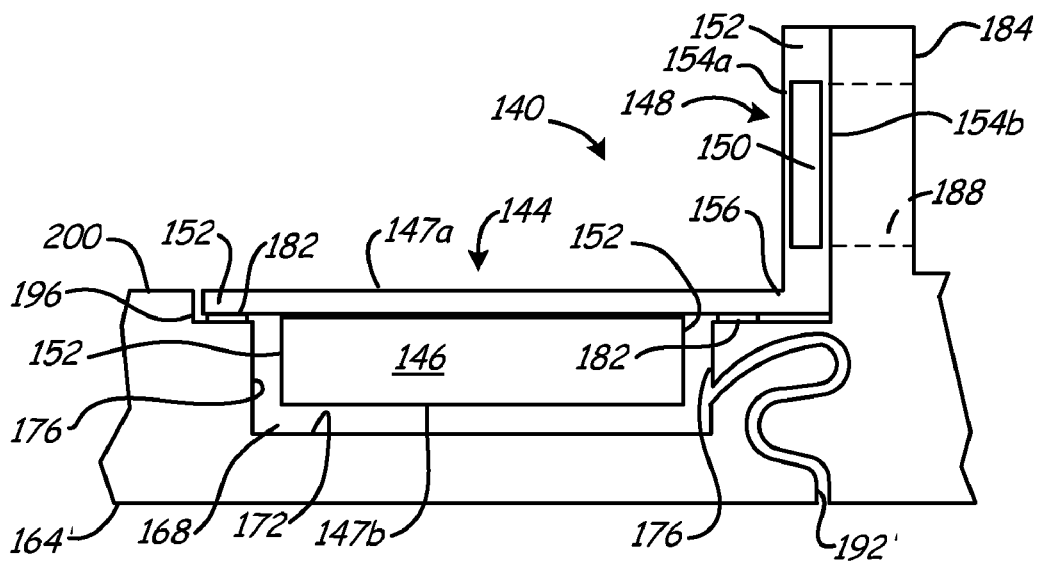
FIG. 9 is a cutaway, side view of the multi-functional filter assembly of FIG. 6 installed in another embodiment of a base plate for a disk drive.

FIG. 9 presents a variation of the base plate 164 depicted in FIG. 8 for use in combination with the filter assembly 140. Common components/assemblies between the embodiments of FIGS. 8 and 9 are identified by the same reference numeral. A "single prime" designation is used for those corresponding components/assemblies which differ in at least some respect between the FIGS. 8 and 9 embodiments. There are two primary differences between the base plate 164' of FIG. 9 and the base plate 164 of FIG. 8. One is that the base plate 164' of FIG. 9 includes what may be characterized as a "meandering" or "tortuous" breather port 192'. This breather port 192' extends from the exterior surface 202 of the base plate 164' to the recess 168. In this case the breather port 192' is something other than axially extending. The breather port 192' may proceed along any path between the exterior surface 202 of the base plate 164' and the recess 168. Moreover, the breather port 192' intersects with the perimeter-defining side wall 176 associated with the recess 168 in the case of the FIG. 9 embodiment, versus with the base 172 associated with the recess 168 in the case of the FIG. 8 embodiment. The breather port 192' may be of any appropriate configuration and formed in any appropriate manner for providing a diffusion barrier of sorts for any flow from outside the drive that is directed toward the interior of the drive through the breather filter section 144. It should be appreciated that the inclusion of the low permeability side 147b of the breather filter section 144 may alleviate the need for such a diffusion barrier, or at least allow for a "simpler" and less costly diffusion barrier. That is, the filter assembly 100 may indeed allow for the type of breather port 192 presented in the FIG. 8 embodiment that was discussed above.

The configuration of FIG. 9 also differs from configuration of FIG. 8 in that the base plate 164' in FIG. 9 includes a notch 196 for receiving and supporting the laminated structure 152 that is disposed about the breather filter section 144 of the filter assembly 140. This disposes the high permeability side 147a of the breather filter section 144 at least generally flush with a perimeter surface 200 of the base plate 164' that is disposed adjacent to the recess 168. One advantage of this at least generally coplanar relationship is that the breather filter section 144 of the filter assembly 100 may be disposed under a disk of a disk drive that utilizes the base plate 164', without significantly adversely impacting the flow characteristics within the interior of the disk drive. FIG. 9 also illustrates an adhesive 182 between the laminated structure 152 that is disposed beyond the breather filter section 144 of the filter assembly 140 and the base plate 164'. As in the case of the embodiments of FIGS. 5 and 6, this adhesive 182 is disposed entirely beyond the recess 168. Stated another way, the adhesive 182 does not limit or interfere with the flow into the breather filter section 144 of the filter assembly 140 through the low permeability side 147b of the breather filter section 144 in the same general manner discussed above in relation to the FIG. 5 embodiment.

Figure 10:
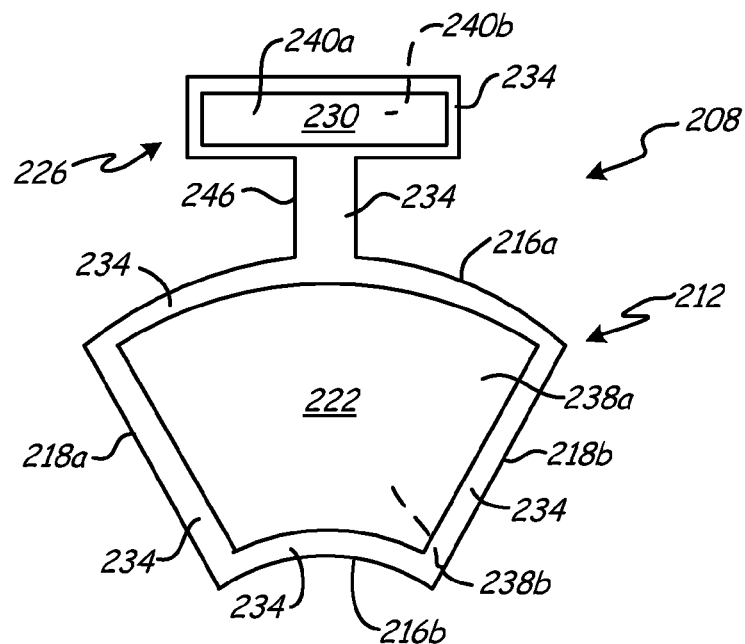
FIG. 10 is a top view of another embodiment of a multi-functional filter assembly that may be used by a disk drive, including the disk drive of FIG. 1.

Another embodiment of a filter assembly is schematically illustrated in FIG. 10, and is identified by reference numeral 208. The filter assembly 208 may be configured in the same manner as the filter assembly 100 discussed above in relation to FIG. 5 (e.g., the cross-sectional configuration of the filter assembly 208 may be the same as that of the filter assembly 100, including using the same layered construction). Generally, the filter assembly 208 includes a breather filter section 212 having a filtering media 222, as well as a recirculation filter section 226 having a filtering media 230. Both the breather filter section 212 and the recirculation filter section 226 are integrated in a common laminated structure 234. A hinge 246 is formed in the laminated structure 234 to facilitate movement of the recirculation filter section 226 relative to the breather filter section 212 when installing the filter assembly 208 in a disk drive.

Like the filter assembly 100 of FIG. 5, the breather filter section 212 includes a high permeability side 238a on the "drive side" of the filtering media 222 for the breather filter section 212, and a low permeability side 238b on the "environment side" of the filtering media 222 for the breather filter section 212. That is, there is less resistance to a flow proceeding through the high permeability side 238a to the filtering media 222 of the breather filter section 212 (i.e., a flow emanating from inside the disk drive) than to a flow proceeding through the low permeability side 238b to the filtering media 222 of the breather filter section 212 (i.e., a flow emanating from the environment, or external to the disk drive). The various characteristics presented above in relation to the filter assembly 100 are thereby equally applicable to the filter assembly 208, including without limitation the various ways discussed above for quantifying these flow characteristics.

The breather filter section 212 of the filter assembly 208 is at least generally wedge-shaped in plan view and as illustrated in FIG. 10. That is, the opposing side edges 218a, 218b taper at least generally toward each other progressing from a wide end 216a of the breather filter section 212 toward a narrow end 216b of the breather filter section 212. The function provided by this profile is to maximize the breathable surface area and to accommodate a desired quantity of filtering media 222 (e.g., carbon amounts). The laminated structure 234 on the wide end 216a of the breather filter section 212 is also arcuately-shaped. In one embodiment, both the wide end 216a of the breather filter section 212 and the laminated structure 234 disposed beyond the breather filter section 212 in the direction of the hinge 246 are defined by the same radius as a perimeter of a disk in a disk drive incorporating the filter assembly 208. The illustrated embodiment also has the narrow end 216b of the breather filter section 212, as well as that portion of the packaging 234 that is disposed beyond the breather filter section 212 in a direction that is at least generally away from the hinge 246, being arcuate as well. The narrow end 216b may be located in the lowest pressure area of the drive.

The laminated structure 234 "necks down" between the breather filter section 212 and the recirculation filter section 226 to define the hinge 246 to allow the recirculation filter section 226 to be moved relative to the breather filter section 212 when installing the filter assembly 208 in a disk drive. The hinge 246 may be of any appropriate configuration that allows for the described relative movement. Any appropriate configuration may be incorporated into the laminated structure 234 to allow the recirculation filter section 226 to be moved relative to the breather filter section 212 during installation.

Like the filter assembly 100 of FIG. 5, the recirculation filter section 226 for the filter assembly 208 of FIG. 10 includes a high permeability side 240a on the "inlet side" to the filtering media 230 of the recirculation filter section 226 of the filter assembly 208, and a high permeability side 240b on the "outlet side" from the filtering media 222 for the recirculation filter section 226 (i.e., opposite the high permeability side 240a). The various characteristics presented above in relation to the filter assembly 100 are thereby equally applicable to the filter assembly 208, including without limitation the various way discussed above for quantifying the flow characteristics through the recirculation filter section 112.

Figure 11:
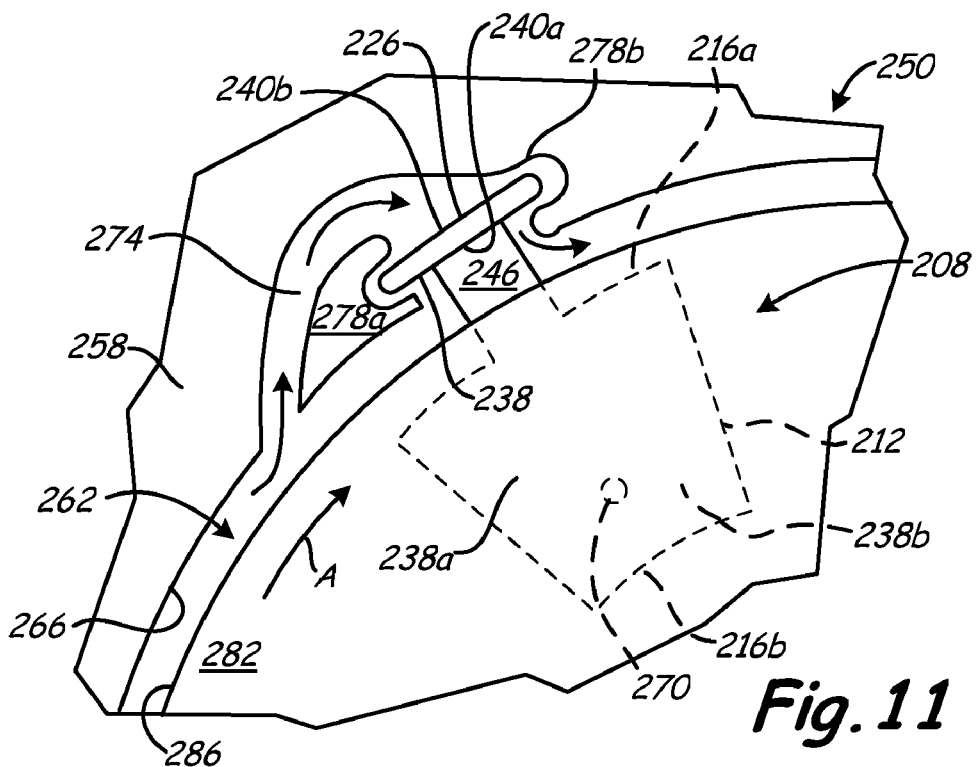
FIG. 11 is a top view of the multi-functional filter assembly of FIG. 10 installed in one embodiment of a base plate for a disk drive.

FIG. 11 illustrates the filter assembly 208 of FIG. 10 installed on one embodiment of a base plate 258 of a disk drive 250. The disk drive 250 may be of the same general configuration of the disk drive 10 discussed above in relation to FIG. 10 or of any other appropriate configuration. The disk drive 250 includes a disk 282 that rotates in the direction of the arrow A during disk drive operations. This disk 282 is disposed within a recess 262 that is formed in the base plate 258. A perimeter of this recess 262 is defined by a side wall 266. There is a small space between a perimeter 286 of the disk 282 and the side wall 266. The perimeter 286 of the disk 282 and the side wall 266 associated with the recess 262 are at least generally parallel with each other.

The breather filter section 212 of the filter assembly 208 is disposed beneath or under the disk 282. The perimeter 286 of the disk 282 and the wide end 216a of the breather filter section 212 are at least slightly spaced, and are disposed in at least generally parallel relation. Generally, the breather filter section 212 is disposed in a low pressure region within the disk drive. Preferably, the base plate 258 includes a recess of the type discussed above in relation to either of the embodiments of FIGS. 8 and 9 for receiving the breather filter section 212 (not shown). The base plate 258 includes a breather port 270 that extends completely through the base plate 258 in any appropriate manner. The breather port 270 may be of any appropriate configuration that fluidly interconnects the interior of the disk drive 250 with the environment in which the disk drive 250 is being used, so long as any flow of this type is directed through the breather filter section 212 of the filter assembly 208. Preferably this breather port 270 intersects with a recess formed in the base plate 258, in which the breather filter section 212 is again preferably disposed and in the manner discussed above in relation to either of the embodiments of FIGS. 8-9.

The base plate 258 is also configured to direct a flow through a channel 274 formed in the base plate 258, and then through the recirculation filter section 226 of the filter assembly 208. This flow is represented by the arrows in the space between the perimeter 286 of the disk 282 and the side wall 266, as well as by the arrows in the channel 274. The base plate 258 includes a pair of supports 278a, 278b that capture/support opposing edge portions of the recirculation filter section 226 of the filter assembly 208. The supports 278a, 278b are spaced so that the flow therebetween passes through the filtering media 230 of the recirculation filter section 226. The recirculation filter section 226 may be appropriately attached to one or both of these supports 278a, 278b (e.g., using an appropriate adhesive).

Each of the above-described embodiments of multi-functional filter assemblies 100, 140, and 208 may be used in a disk drive of any type and of any appropriate configuration. What is of importance is the control of the flow provided by the packaging used by these filter assemblies 100, 140, and 208, as well as the manner in which a flow is provided through a low permeability section to the breather filter section of these filter assemblies 100, 140, 208 (e.g., the increased area through which a flow may be directed to the filtering media of the breather filter section for these filter assemblies 100, 140, 208; the disposition of the breather filter section for these filter assemblies 100, 140, 208 within a recess formed in a base plate; the spacing provided between the base plate and the low permeability section to the breather filter section of these filter assemblies 100, 140, 208).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A filter assembly, comprising:
a plurality of layers that incorporate a breather filter section, a recirculation filter section and a hinge that couples the breather filter section to the recirculation filter section, wherein said breather filter section is disposable within a flow between an interior and an exterior of a disk drive, wherein said recirculation filter section is disposable within a flow totally contained within the interior of the disk drive, wherein said breather filter section comprises first and second sides.

2. A filter assembly, as claimed in claim 1, wherein:
said second side of said breather filter section is at least two times as permeable as said first side of said breather filter section.

3. A filter assembly, as claimed in claim 1, wherein:
said second side of said breather filter section is at least ten times as permeable as said first side of said breather filter section.

4. A filter assembly, as claimed in claim 1, wherein:
said filter assembly is a laminated structure.

5. A filter assembly, as claimed in claim 1, wherein:
each of said plurality of layers is flexible.

6. A filter assembly, as claimed in claim 1, wherein:
said filter assembly is flexible in that it can be stored in a flat orientation and further in that said hinge can pivot said recirculation filter section about said breather filter section when installing said filter assembly in the disk drive.

7. A filter assembly, as claimed in claim 1, wherein:
said breather filter section is at least generally wedged-shaped in plan view.

8. A data storage device, comprising:
a first housing section comprising a first recess on an interior surface of said first housing section;
a second housing section interconnected with said first housing section to define an enclosed space;
a first port that extends from an exterior surface of said first housing section to said first recess;
a computer-readable storage medium disposed within said enclosed space; and
a filter assembly disposed within said enclosed space and includes a plurality of interconnected layers including an upper layer, the filter assembly comprising a breather filter section that shares the upper layer with a recirculation filter section, wherein said breather filter section extends within said first recess and comprises a top surface, which is a portion of the upper layer of the filter assembly, and a bottom surface, wherein said first recess comprises a base and an annular side wall, and wherein an entirety of said bottom surface is disposed in spaced relation to said base of said first recess.

9. A data storage device, as claimed in claim 8, wherein: said plurality of layers comprises a plurality of flexible layers.

10. A data storage device, as claimed in claim 8, wherein: said filter assembly comprises a hinge between said breather filter section and said recirculation filter section.

11. A data storage device, as claimed in claim 8, wherein: said filter assembly is a laminated structure.

12. A data storage device, as claimed in claim 8, further comprising:
a first annular seal between said filter assembly and said first housing section, wherein an entirety of said breather filter section is located inwardly of said first annular seal.

13. A data storage device, as claimed in claim 8, wherein: said breather filter section is at least generally flush with a perimeter portion of said first housing section that is disposed about said first recess.

14. A data storage device, as claimed in claim 8, wherein: said breather filter section comprises first and second sides, and first and second ends, wherein said first and second sides extend at least generally toward each other progressing from said first end to said second end, wherein said second end is closer to a rotational axis of said computer-readable storage medium than said first end.

15. A data storage device, as claimed in claim 8, wherein: said breather filter section is at least generally wedged-shaped in plan view.

16. A data storage device, as claimed in claim 8, wherein: an open space separates said first housing section and an entire side of said breather filter section that faces said first housing section.

17. A data storage device, as claimed in claim 8, wherein: said annular side wall and said base define said first recess, wherein said breather filter section is separated from said base by a first space, and wherein an annular second space is disposed between said breather filter section and said annular side wall.

18. A data storage device, as claimed in claim 8, wherein: said annular side wall and said base define said first recess, wherein said breather filter section is spaced from said base and is further spaced inwardly from said annular side wall.

19. A data storage device, as claimed in claim 8, wherein: said breather filter section comprises a filtering media disposed between said top surface of said breather filter section and said bottom surface of said breather filter section, wherein said bottom surface of said breather filter section faces said first housing section, and wherein said top surface of said breather filter section faces an interior of said data storage device, wherein said top and bottom surfaces have a different permeability.

20. A data storage device, as claimed in claim 19, wherein: said top surface has a larger permeability than said bottom surface.

21. A data storage device, as claimed in claim 19, wherein: said top surface of said breather filter section is at least twice as permeable as said bottom surface of said breather filter section.

22. A data storage device, as claimed in claim 19, wherein: said top surface of said breather filter section is at least ten times as permeable as said bottom surface of said breather filter section.

23. A data storage device, comprising:
a first housing section;
a second housing section interconnected with said first housing section to define an enclosed space;
a first port that extends from an exterior surface of said first housing section to an interior surface of said first housing section;
a computer-readable storage medium disposed within said enclosed space defined by said first and second housing sections; and
a filter assembly disposed within said enclosed space and comprising an upper layer and a lower layer having an aperture, the filter assembly including a breather filter section disposable within a flow between an interior and an exterior of said data storage device, a recirculation filter section disposable within a flow totally contained within said interior of said data storage device and a hinge between said breather filter section and said recirculation filter section, wherein said breather filter section comprises a first filtering media disposed between said upper and lower layers, wherein a flow may be directed through each of said upper and lower layers to reach said filtering media of said breather filter section, wherein said recirculation filter section comprises a second filtering media disposed between said upper layer and the aperture in the lower layer.

24. A data storage device, as claimed in claim 23, wherein:
said first housing section comprises a first recess;
said first port extends from said exterior surface of said first housing section to said interior surface of said first housing section within said first recess; and said breather filter section extends within said first recess.

25. A data storage device, as claimed in claim 24, wherein:
a space separates said first housing section and said lower layer of said filter assembly in said breather filter section.

26. A data storage device, as claimed in claim 24, wherein:
said first recess comprises a base and an annular side wall, and wherein an entirety of said lower layer in said breather filter section is disposed in spaced relation to said base.

27. A data storage device, as claimed in claim 24, wherein:
said first housing section comprises a perimeter-defining side wall and a base that define said first recess, wherein said breather filter section is spaced from said base and is further spaced inwardly from said perimeter-defining side wall.

28. A data storage device, as claimed in claim 24, wherein:
said first housing section comprises a perimeter-defining side wall and a base that define said first recess, wherein said breather filter section is separated from said base by a first space, and wherein an annular second space is disposed between said breather filter section and said side wall.

29. A data storage device, as claimed in claim 24, further comprising:

a first annular seal between said filter assembly and said first housing section that is disposed about said first recess, wherein an entirety of said breather filter section is located inwardly of said first annular seal.

30. A data storage device, as claimed in claim 24, wherein:
said breather filter section is at least generally flush with a perimeter portion of said first housing section that is disposed about said first recess.

31. A data storage device, as claimed in claim 23, wherein:
said filter assembly is a laminated structure.

32. A data storage device, as claimed in claim 23, wherein:
said filter assembly comprises a plurality of flexible layers.

33. A data storage device, as claimed in claim 23, wherein:
said breather filter section comprises first and second sides and first and second ends, wherein said first and second sides extend at least generally toward each other progressing from said first end to said second end, wherein said second end is closer to a rotational axis of said computer-readable storage medium than said first end.

34. A data storage device, as claimed in claim 23, wherein:
said breather filter section is at least generally wedged-shaped in plan view.

35. A data storage device, as claimed in claim 23, wherein:
said upper layer is at least twice is permeable as said lower layer.

36. A data storage device, as claimed in claim 23, wherein:
said upper layer is at least ten times as permeable as said lower layer.

* * * * *

UNITED STATES PATENT AND TRADEMARK OFFICE
CERTIFICATE OF CORRECTION

PATENT NO. : 7,382,572 B1  Page 1 of 1
APPLICATION NO. : 10/916221
DATED : June 3, 2008
INVENTOR(S) : Robert D. Turner et al.

It is certified that error appears in the above-identified patent and that said Letters Patent is hereby corrected as shown below:

Title page,
Item (57), line 5, delete "during installation of the filter".

Title page,
Item (57), line 6, delete "assembly in a disk drive".

Signed and Sealed this

Fifth Day of August, 2008

JON W. DUDAS
*Director of the United States Patent and Trademark Office*